United States Patent
Nagai et al.

(10) Patent No.: US 6,463,009 B1
(45) Date of Patent: Oct. 8, 2002

(54) POSITION DETECTING DEVICE AND INDUSTRIAL VEHICLE HAVING THE POSITION DETECTING DEVICE

(75) Inventors: Katsumi Nagai; Yasunobu Yagita, both of Aichi-ken (JP)

(73) Assignees: Kabushiki Kaisha Toyoda Jidoshokki Seisakusho, Kariya (JP); Honda Electronics Co., Ltd., Toyohashi (JP)

( * ) Notice: Subject to any disclaimer, the term of this patent is extended or adjusted under 35 U.S.C. 154(b) by 0 days.

(21) Appl. No.: 09/644,738

(22) Filed: Aug. 23, 2000

(30) Foreign Application Priority Data

Aug. 26, 1999 (JP) ............................ 11-240365

(51) Int. Cl.⁷ .............................. G01S 15/02; B66F 9/24
(52) U.S. Cl. ......................................... 367/99; 367/902
(58) Field of Search .......................... 367/99, 902, 900, 367/13

(56) References Cited

U.S. PATENT DOCUMENTS 4,581,726 A   4/1986  Makino et al. ................ 367/99
4,910,717 A   3/1990  Terry ............................ 367/99

FOREIGN PATENT DOCUMENTS

| DE | 3206396 A1 | * 9/1983 | |
| JP | 63-088477 | 4/1988 | ............. G01S/7/52 |
| JP | 5-087911 | 4/1993 | ............. G01S/7/52 |
| JP | 10-238513 | 9/1998 | |
| JP | 10-282224 | 10/1998 | ............. G01S/7/526 |
| JP | 10-310396 | 11/1998 | ............. B66F/9/24 |

* cited by examiner

*Primary Examiner*—Daniel T. Pihulic
(74) *Attorney, Agent, or Firm*—Morgan & Finnegan, LLP

(57) ABSTRACT

In a position detecting device which detects a piston rod based on the time elapsed from a point at which an ultrasonic wave is emitted from an ultrasonic wave sensor toward a lower end surface of the piston rod reciprocatingly moved linearly by supply and discharge of a working oil with respect to a hydraulic cylinder to a point at which the ultrasonic wave reflected by the lower end surface of the piston rod is received by the ultrasonic wave sensor, if the working oil's temperature is detected by a temperature sensor, then a microcomputer sets the strength of the ultrasonic wave emitted from the ultrasonic wave sensor in accordance with the temperature of the working oil so as to accurately detect the position of the piston.

10 Claims, 7 Drawing Sheets

US 6,463,009 B1

POSITION DETECTING DEVICE AND INDUSTRIAL VEHICLE HAVING THE POSITION DETECTING DEVICE

BACKGROUND OF THE INVENTION

1. Field of the Invention

The present invention relates to a position detecting device for detecting a movement position of a piston rod or the like of a hydraulic piston equipped in a fork lift or the like, and also relates to an industrial vehicle installed with the position detecting device.

2. Description of the Related Art

A fork lift called as an industrial vehicle is generally equipped with a hydraulic cylinder for moving a fork upward and downward. The hydraulic cylinder incorporates therein a piston rod as a movable member, which is linearly reciprocated by supply and discharge of working oil. The hydraulic cylinder is provided at its bottom portion with an ultrasonic wave sensor which emits an ultrasonic wave toward the lower end surface of the movable member and receives the ultrasonic wave reflected by the lower end surface of the movable member, and a position detecting device is employed to detect a position of the movable member on the basis of a time elapsed from a point at which the ultrasonic wave is emitted to a point at which the ultrasonic wave is received.

The above conventional position detecting device is designed to be constant in terms of both the strength of the ultrasonic wave emitted from the ultrasonic sensor and the sensitive level of the ultrasonic wave when it is received. In the case where the temperature of the working oil within the hydraulic cylinder is low, the high viscosity of the working oil is likely to attenuate the ultrasonic wave in the course of the propagation of the ultrasonic wave through the working oil. Further, the propagation of the ultrasonic wave is likely to be worsened at the interface between the ultrasonic wave sensor and the working oil. For these reasons, in the case where a distance between the ultrasonic wave sensor provided at the bottom portion of the hydraulic cylinder and the lower end surface of the movable member is large, an amplitude of the echo, i.e. the ultrasonic wave reaching the ultrasonic sensor by being reflected by the lower end surface of the movable member and propagated through the working oil, becomes smaller than the sensitive level as shown in FIG. 13, making it difficult to receive the ultrasonic wave. In this case, the position of the movable member cannot be detected.

In contrast, in the case where the temperature of the working oil within the hydraulic cylinder is high, the attenuation of the ultrasonic wave in the course of the propagation of the ultrasonic wave through the working oil is small because of the low viscosity of the working oil. Therefore, if the ultrasonic wave emitted from the ultrasonic wave sensor provided at the bottom portion of the hydraulic cylinder is strong, there are generated not only the echo, that is, the ultrasonic wave reaching the ultrasonic sensor by being reflected on the lower end surface of the movable member and propagated through the working oil, but also a reverberation which is propagated through a cylindrical wall of the hydraulic cylinder to reach the ultrasonic wave sensor and which has a higher level than the sensitive level of the ultrasonic wave sensor as shown in FIG. 14. In this case, since the reverberation propagated through the metal cylindrical wall of the hydraulic cylinder reaches the ultrasonic wave sensor before the echo reaches the ultrasonic wave sensor, the time elapsed from the point at which the ultrasonic wave is emitted from the ultrasonic wave sensor to the point at which the ultrasonic wave is received is inadequately determined on the basis of the reverberation, not the echo. Therefore, the position of the movable member detected on the basis of this time elapsed is inaccurate.

In the typical position detecting device, regardless of the distance between the ultrasonic wave sensor provided at the bottom portion of the hydraulic cylinder and the lower end surface of the movable member, the strength (the amplitude) of the ultrasonic wave emitted from the ultrasonic wave sensor is constant as well as the sensitive level when the ultrasonic wave is received is constant. Therefore, in the typical position detecting device, in the case where the distance between the ultrasonic wave sensor provided at the bottom portion of the hydraulic cylinder and the lower end surface of the movable member is relatively small, the reverberation propagated through the metal cylindrical wall of the hydraulic cylinder reaches the ultrasonic wave sensor before the echo reaches the ultrasonic wave sensor as shown in FIG. 15, and consequently, the time elapsed from the point at which the ultrasonic wave is emitted from the ultrasonic wave sensor to the point at which the ultrasonic wave is received is inadequately determined on the basis of the reverberation, not the echo. Therefore, the position of the movable member detected on the basis of this time elapsed is inaccurate.

On the other hand, if the distance between the ultrasonic wave sensor and the lower end surface of the movable member is relatively large, almost no reverberation is generated but the amplitude of the ultrasonic wave reflected by the lower end surface of the movable member becomes smaller than the sensitive level before the ultrasonic wave is received by the ultrasonic wave sensor as shown in FIG. 16, making it difficult to receive the ultrasonic wave. Consequently, the position of the movable member cannot be detected.

SUMMARY OF THE INVENTION

An object of the present invention is to provide a position detecting device, and an industrial vehicle having the position detecting device, which can accurately detect a position of a movable member of a hydraulic cylinder.

A position detecting device according to the present invention is a position detecting device for detecting a position of a movable member, movable within a hydraulic cylinder, using an ultrasonic wave, the device including: an ultrasonic wave sensor which emits an ultrasonic wave toward the movable member and receives the ultrasonic wave reflected by the movable member; position calculating means for counting a time elapsed from a point at which the ultrasonic wave is emitted to a point at which the ultrasonic wave is received, and calculating a position of the movable member relative to the ultrasonic wave sensor on the basis of the time elapsed thus counted; and ultrasonic wave strength setting means for variably setting a strength of the ultrasonic wave emitted from the ultrasonic wave sensor.

A position detecting device according to the present invention is a position detecting device for detecting a position of a movable member, movable within a hydraulic cylinder, using an ultrasonic wave, which may include: an ultrasonic wave sensor which emits the ultrasonic wave toward the movable member and receives the ultrasonic wave reflected by the movable member; position calculating means for counting a time elapsed from a point at which the ultrasonic wave is emitted to a point at which the ultrasonic wave is received, and calculating a position of the movable member relative to the ultrasonic wave sensor on the basis of the time elapsed thus counted; and reception sensitive level setting means for variably setting a reception sensitive level for the ultrasonic wave received by the ultrasonic wave sensor.

DETAILED DESCRIPTION OF THE PREFERRED EMBODIMENTS

Preferred embodiments of the present invention will be described.

Figure 1:
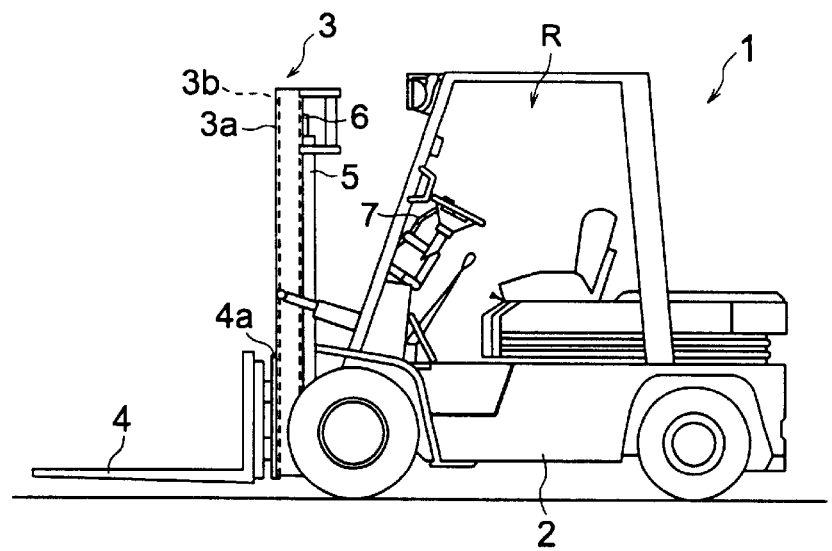
FIG. 1 is a side view showing a fork lift.

FIG. 1 is a side view showing a fork lift 1 which serves as an industrial vehicle. As shown in FIG. 1, a mast 3 is provided on a front portion of a vehicle body 2 of the fork lift 1. The mast 3 is made up of an outer mast 3a and an inner mast 3b, and a lift bracket 4a having a fork 4 is provided on an inner side of the inner mast 3b to be vertically movable. A hydraulic cylinder 5 is disposed behind the mast 3. A piston rod 6 is incorporated in the hydraulic cylinder 5 so that it can be reciprocated vertically.

The leading end of a piston rod 6 is connected to an upper portion of the inner mast 3b. A chain wheel (not shown) is rotatably supported on the upper portion of the inner mast 3b. A chain (not shown) one end of which is connected to a lift bracket 4 is suspended on the chain wheel. By operating a loading lever 7 provided in a driving room R, the working oil is supplied to and discharged from the hydraulic cylinder 5, and the piston rod 6 is driven vertically, so that the fork 4 together with the lift bracket 4a is moved upward and downwardly along the mast 3.

Figure 2:
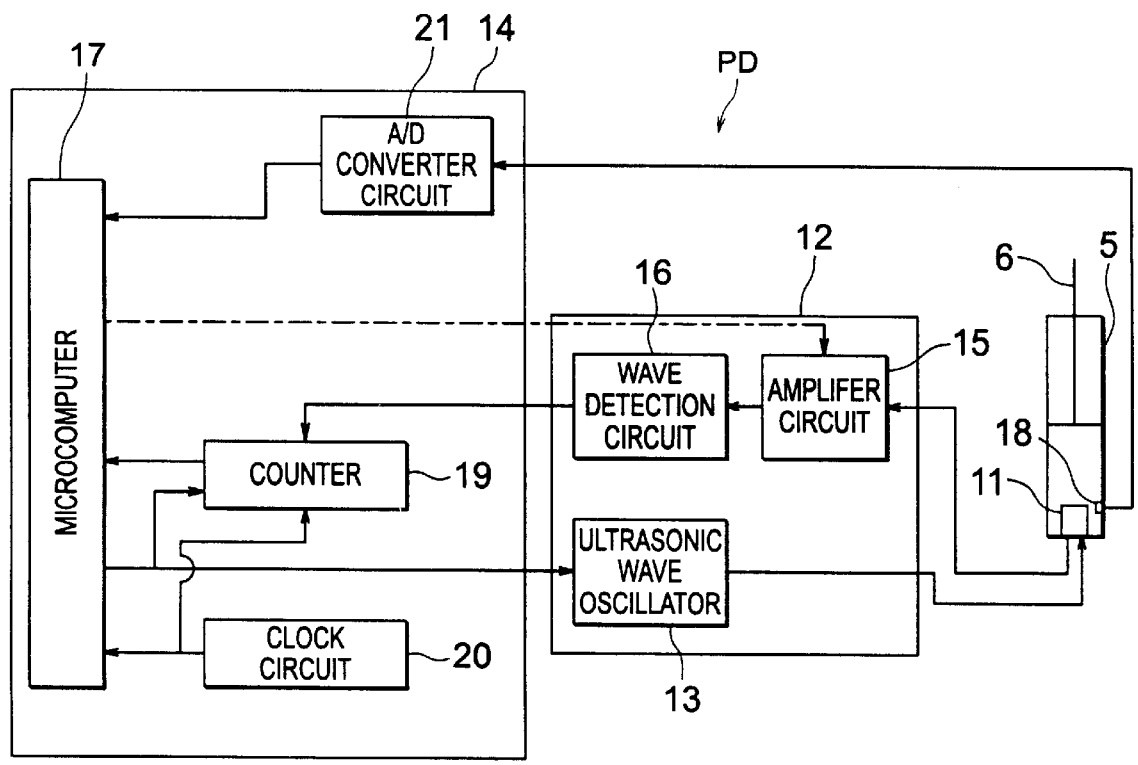
FIG. 2 is a block diagram showing an electric arrangement of a position detecting device.

FIG. 2 is an electric block diagram of a position detecting device PD for detecting a position of the piston rod 6 of the hydraulic cylinder 5, i.e. an elevated position of the fork 4.

As shown in FIG. 2, an ultrasonic sensor 11 is mounted onto a bottom portion of the hydraulic cylinder 5. This ultrasonic sensor 11 emits an ultrasonic wave toward a lower end surface of the piston rod 6, and receives the ultrasonic wave reflected by the lower end surface thereof.

The ultrasonic wave sensor 11 is connected to an emission/reception circuit 12. The emission/reception circuit 12 is provided with an ultrasonic wave oscillator 13 to oscillate and send an ultrasonic wave signal of a predetermined frequency to the ultrasonic wave sensor 11 in response to a control signal from a control circuit 14. The emission/reception circuit 12 is provided with an amplifier circuit 15 and a wave detection circuit 16, so that the amplifier circuit 15 amplifies an electric signal of the ultrasonic wave received by the ultrasonic wave sensor 11, and the wave detection circuit 16 outputs a pulse signal to the control device 14 at a point that the ultrasonic wave reflected by the lower end surface of the piston rod 6 is received by the ultrasonic wave sensor 11.

The control device 14 employs a microcomputer 17 as a core element for arithmetic calculation and control. The microcomputer 17 is equipped with not-shown ROM and RAM as storage means. Programs such as a program for detecting a position of the piston rod 6 as described later are stored in the ROM, and data on a detected position of the piston rod 6, data on temperature of the working oil detected by a temperature sensor 18 and so forth are stored in the RAM. The temperature sensor 18 is disposed close to the ultrasonic wave sensor 11 provided at the bottom portion of the hydraulic cylinder 11 as shown in FIG. 2 so as to detect a temperature of the working oil in the hydraulic cylinder 5.

The control device 14 is provided with a counter 19 and a clock circuit 20. The counter 19 counts a time elapsed from a point at which the ultrasonic wave is emitted from the ultrasonic wave sensor 11 to a point at which the ultrasonic wave reflected by the lower end surface of the piston rod 6 is received by the ultrasonic wave sensor 11 (that is, at a point at which the pulse signal is outputted from the wave detection circuit 16), on the basis of clock signals sent from the clock circuit 20.

In addition, an A/D converter circuit 21 provided in the control circuit 14 converts a working oil temperature detection signal outputted from the temperature sensor 18 into a digital signal, and outputs the digital signal to the microcomputer 17.

The microcomputer 17 outputs a control signal allowing the ultrasonic wave oscillator 13 of the emission/reception circuit 12 to oscillate a voltage of the predetermined frequency. This control signal is used so that a voltage to be applied to an vibration element of the ultrasonic wave sensor 11 is outputted from the ultrasonic wave oscillator 13, and this voltage is, for instance, a variable voltage of 1 MHz.

The microcomputer 17 is directly connected to the amplifier circuit 15 of the emission/reception circuit 12, and is capable of setting a reception sensitive level of the ultrasonic wave received by the ultrasonic wave sensor 11.

Next, a position detecting operation of the position detecting device PD will be described.

By manipulating the loading lever 7 provided in the driving room R of the fork lift 1, the piston rod 6 of the hydraulic cylinder 5 is driven vertically. As elevational movement of the fork lift 4 together with the lift bracket 4a along the mast 3 is started, the microcomputer 17 starts executing the control for detecting the position of the piston rod 6 and detecting the elevated position of the fork lift 4.

First Position Detecting Control:

A first position detecting control based on the temperature of the working oil in the hydraulic cylinder 5 will be described.

The working oil temperature detection signal outputted through the A/D converter circuit 21 from the temperature sensor 18 is inputted to the microcomputer 17, and the microcomputer 17 recognizes the temperature of the working oil on the basis of the temperature detection signal.

Figure 3:
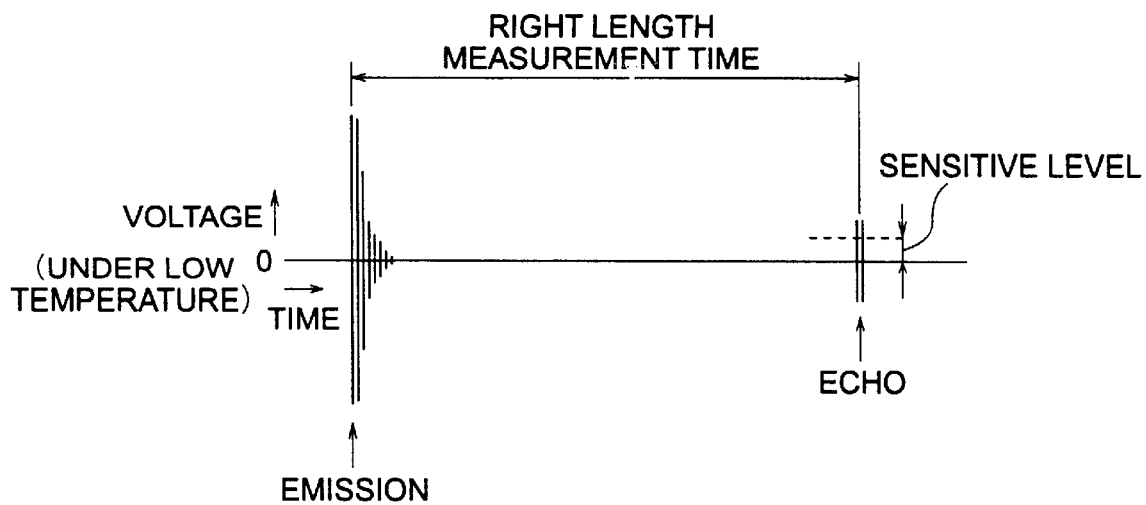
FIG. 3 is a view showing a signal wave form of a first position detecting control under a low temperature.

As explained in the "Background of the Invention" section, the lower temperature of the working oil causes the higher viscosity of the working oil, and thus the working oil attenuates more the ultrasonic wave propagated therethrough. Further, the propagation of the ultrasonic wave is worsened at the interface between the ultrasonic wave sensor and the working oil. For these reasons, in the case where the temperature of the working oil is lower than a set value (the low temperature state), the microcomputer 17 increases the voltage to be applied to the vibration element of the ultrasonic wave sensor 11, as shown in FIG. 3, through the control signal outputted to the ultrasonic wave oscillator 13, so as to strengthen (make larger the amplitude of) the ultrasonic wave emitted from the ultrasonic wave sensor 11. This makes it possible for the microcomputer 17 to accurately count the time elapsed from the point at which the ultrasonic wave is emitted from the ultrasonic wave sensor to the point at which the ultrasonic wave reflected by the lower surface of the piston rod 6 is received, even if the temperature of the working oil is low. Consequently, the position of the piston rod 6 can be accurately detected on the basis of the time elapsed.

Figure 4:
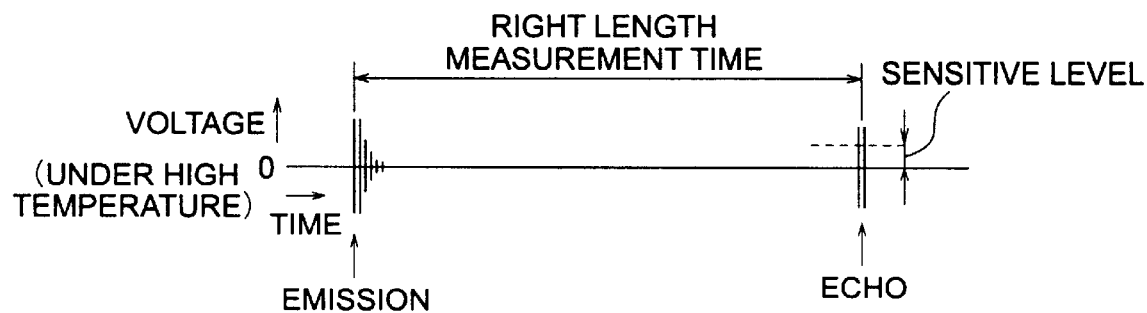
FIG. 4 is a view showing a signal wave form of the first position detecting control under a high temperature.

On the other hand, as the temperature of the working oil is higher, the viscosity thereof is lower, and thus the working oil less attenuates the ultrasonic wave propagated therethrough. Therefore, in the case where the temperature of the working oil is higher than the set value (the high temperature state) the microcomputer 17 decreases the voltage to be applied to the vibration element of the ultrasonic wave sensor 11, through the control signal outputted to the ultrasonic wave oscillator 13, as shown in FIG. 4, so as to make small the amplitude of the ultrasonic wave emitted from the ultrasonic wave sensor 11. This makes it possible to suppress the generation of the reverberation (see the "Background of the Invention" section) that is propagated through the cylindrical wall of the hydraulic cylinder 11 to reach the ultrasonic wave sensor 11. Consequently, the microcomputer 17 can accurately count the time elapsed from the point at which the ultrasonic wave is emitted from the ultrasonic wave sensor 11 to the point at which the ultrasonic wave reflected by the lower surface of the piston rod 6 is received, and therefore, the position of the piston rod 6 can be accurately detected on the basis of the time elapsed.

As described above, the microcomputer 17 controls the voltage to be applied to the vibration element of the ultrasonic wave sensor 11 in accordance with the temperature of the working oil, and varies the amplitude (the strength) of the ultrasonic wave to be emitted from the ultrasonic wave sensor 11, thereby accurately detecting the position of the piston rod 6 even if the viscosity of the working oil is changed due to the temperature change thereof.

Figure 5:
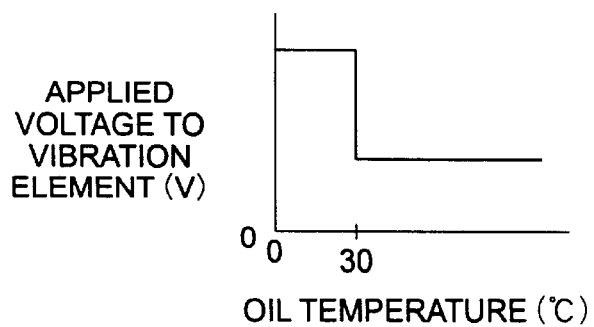
FIG. 5 is a view showing a relationship between a strength of the ultrasonic wave and a temperature in the first position detecting control.

In the case where the above-noted first position detecting control is carried out, the microcomputer 17 executes a two-step control program in which, if the temperature of the working oil falls within a range of 0° C. to 30° C., the voltage to be applied to the vibration element of the ultrasonic wave sensor 11 is set to a high voltage, whereas if the temperature exceeds 30° C., the temperature to be applied to the vibration element of the ultrasonic wave sensor is changed to be a low voltage, as shown in FIG. 5.

Figure 6:
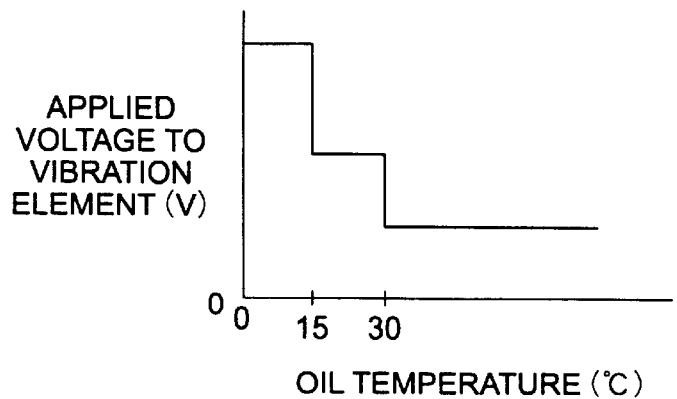
FIG. 6 is a view showing a relationship between a strength of the ultrasonic wave and a temperature in a modification of the first position detecting control.

A three-step control program as shown in FIG. 6 may be executed in such a manner that the voltage to be applied to the vibration element of the ultrasonic wave sensor 11 is set to a high voltage if the temperature of the working oil is in a range of, for example, 0° C. to 15° C., to an intermediate voltage if it exceeds 15° C. but is not higher than 30° C., and to a low voltage if it exceeds 30° C.

Figure 7:
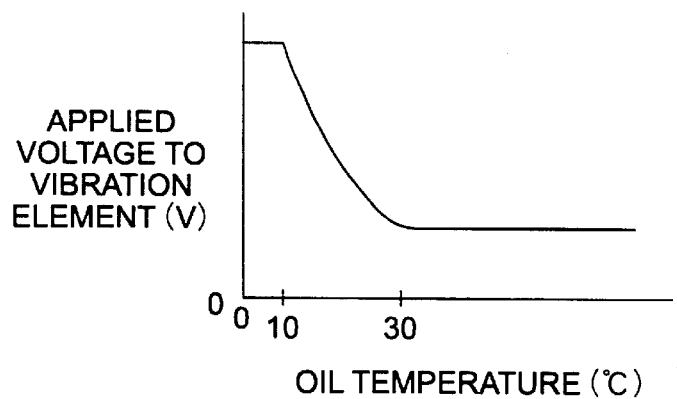
FIG. 7 is a view showing a relationship between a strength of the ultrasonic wave and a temperature in another modification of the first position detecting control.

Further, as shown in FIG. 7, such a control program may be executed that the voltage to be applied to the vibration element of the ultrasonic wave sensor 11 is set to a high constant voltage if the temperature of the working oil is in a range of, for example, 0° C. to 10° C., is consecutively changed to a lower voltage if it exceeds 10° C. but is not higher than 30° C., and changed to the lowest constant voltage if it exceeds 30° C.

In addition, if the microcomputer 17 changes the voltage to be applied to the vibration element of the ultrasonic wave sensor 11 in accordance with the temperature of the working oil, any other (oil-temperature v.s. applied-voltage) characteristics than those shown in FIGS. 5, 6, and 7 may be employed for control.

Second Position Detecting Control:

The first position detecting control described above is designed so that the voltage to be applied to the vibration element of the ultrasonic wave sensor 11 is changed appropriately in accordance with the temperature of the working oil, thereby detecting the position of the piston rod 6. The reception sensitive level of the amplifier circuit 15 of the emission/reception circuit 12 may be set in accordance with the temperature of the working oil.

As mentioned previously, if the temperature of the working oil is lowered, the viscosity of the working oil becomes stronger and therefore the ultrasonic wave propagated through the working oil is likely to be attenuated. Further, the propagation of the ultrasonic wave at the interface between the ultrasonic wave sensor and the working oil is worsened. For these reasons, in the case where the temperature of the working oil is low, the microcomputer 17 lowers the reception sensitive level in the amplifier circuit 15 so that the ultrasonic sensor 11 can receive an ultrasonic wave with a small amplitude. With this arrangement, even if the ultrasonic wave propagated through the working oil becomes smaller in amplitude, the microcomputer 17 can accurately count the time elapsed from the point at which the ultrasonic wave is emitted from the ultrasonic wave sensor 11 to the point at which the ultrasonic wave reflected by the lower surface of the piston rod 6 is received, and therefore, the position of the piston rod 6 can be accurately detected on the basis of the time elapsed.

As described above, as the temperature of the working oil is higher, the viscosity of the working oil is weaker, and thus the attenuation of the ultrasonic wave propagated through the working oil is smaller. For this reason, in the case where the temperature of the working oil is high, the microcomputer 17 raises the reception sensitive level of the amplifier circuit 15 to a high level, so as to execute a control to permit the reception of only the echo and inhibit the reception of the reverberation. With this arrangement, the microcomputer 17 can accurately count the time elapsed from the point at which the ultrasonic wave is emitted from the ultrasonic wave sensor 11 to the point at which the ultrasonic wave reflected by the lower surface of the piston rod 6 is received, and therefore, the position of the piston rod 6 can be accurately detected on the basis of the time elapsed.

Third Position Detecting Control:

Next, a third position detecting control will be described, which sets the reception sensitive level on the basis of a preceding data on the position of the piston rod 6. That is, the third position detecting control is such that the reception level at the time of reception of the ultrasonic wave emitted from the ultrasonic wave sensor 11 and reflected by the lower end surface of the piston rod 6 is set on the basis of the preceding data on the position of the piston rod 6.

The data on the position of the piston rod 6 are stored in the RAM of the microcomputer 17 as mentioned previously. The microcomputer 17 retrieves the position data from the RAM when the piston rod 6 of the hydraulic cylinder 5 is initially driven vertically upon the manipulation of the loading lever 7.

Figure 8:
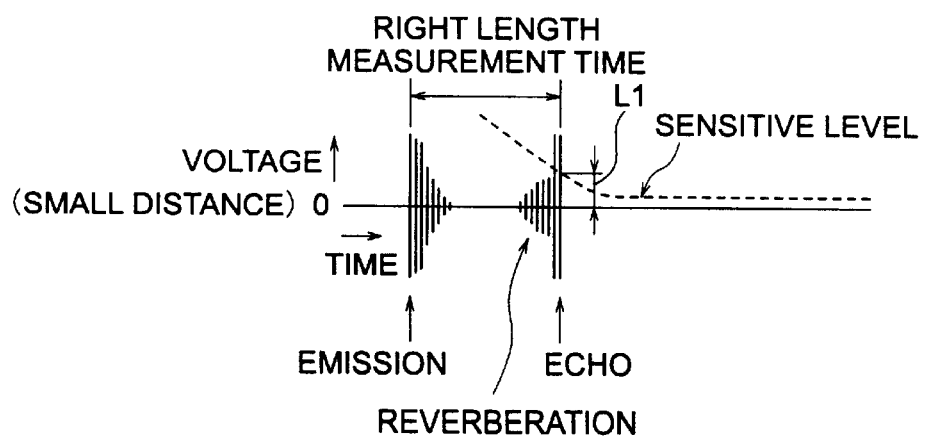
FIG. 8 is a view showing a reception sensitive level of a third position detecting control under a small distance.

As described above, when the piston rod 6 of the hydraulic cylinder 5 is initially driven vertically, the microcomputer 17 retrieves the latest data on the position of the piston rod 6 from the RAM, and sets the reception sensitive level on the basis of the position data such that the reception sensitive level is set to smaller as the position of the piston rod 6 is further from the ultrasonic wave sensor 11 as shown by the broken line in FIG. 8.

If the position data are considered to correspond to a small distance, the reception sensitive level is set to a sensitive level L1 shown in FIG. 8.

As described in the "Background of the Invention" section, in the case where the distance between the ultrasonic wave sensor 11 and the lower end surface of the piston rod 6 is short, reverberation is generated and propagated through the cylindrical wall of the hydraulic cylinder 5 to be received by the ultrasonic wave sensor 11. As shown in FIG. 8, the amplitude of the reverberation is, in general, smaller than the amplitude of the echo propagated through the working oil, and consequently, in order to receive only the echo, it suffices that the reception sensitive level is set to higher than the amplitude of the reverberation but lower than the amplitude of the echo.

Since the setting of the reception sensitive level in the above-noted manner makes it possible to receive only the echo without the reception of the reverberation, the microcomputer 17 can accurately count the time elapsed from the point at which the ultrasonic wave is emitted from the ultrasonic wave sensor 11 to the point at which the ultrasonic wave reflected by the lower surface of the piston rod 6 is received. Therefore, the microcomputer 17 can accurately detect the position of the piston rod 6 on the basis of the time elapsed.

Figure 9:
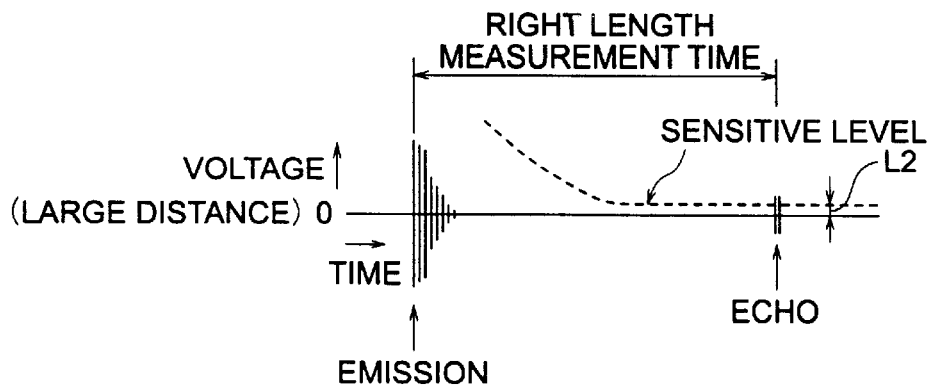
FIG. 9 is a view showing a reception sensitive level of the third position detecting control under a large distance.

FIG. 9 shows a state in which the reception sensitive level is set in the case where the position data are considered to correspond to a large distance. In the case where the distance between the ultrasonic wave sensor 11 and the lower end surface of the piston rod 6 is large, the reverberation is not generated but the amplitude of the echo becomes small, and therefore it is necessary to lower the reception sensitive level. By lowering the reception sensitive level to a level L2, the echo can be received even if the distance between the ultrasonic wave sensor 11 and the lower end surface of the piston rod 6 is large. Consequently, the microcomputer 17 can accurately count the time elapsed from the point at which the ultrasonic wave is emitted from the ultrasonic wave sensor 11 to the point at which the ultrasonic wave reflected by the lower surface of the piston rod 6 is received. This makes it possible for the microcomputer 17 to accurately detect the position of the piston rod 6 on the basis of the time elapsed.

Figure 10:
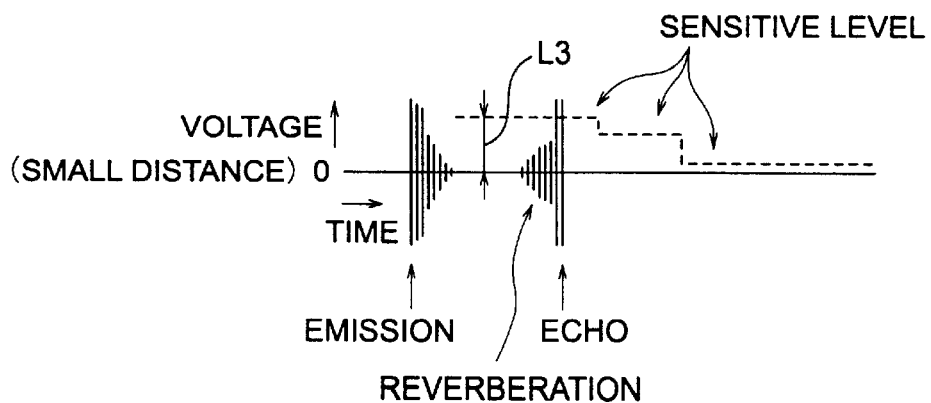
FIG. 10 is a view showing a reception sensitive level of a modification of the third position detecting control under a small distance.
Figure 11:
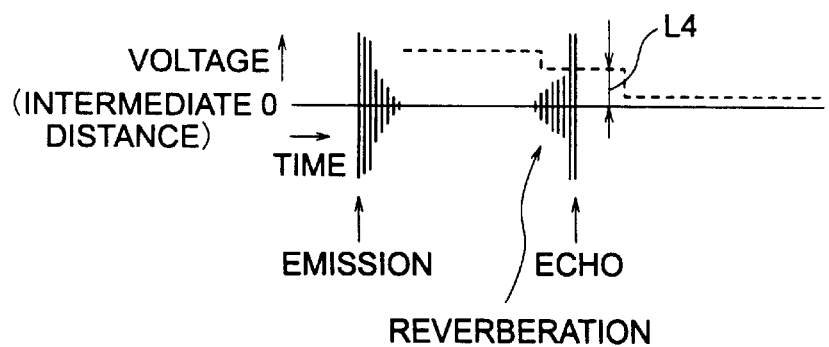
FIG. 11 is a view showing a reception sensitive level of the modification of the third position detecting control under an intermediate distance.
Figure 12:
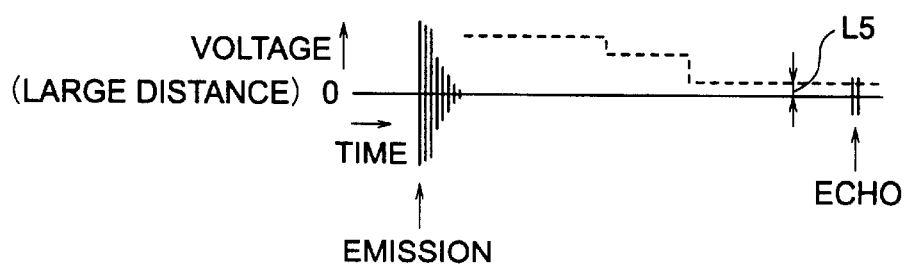
FIG. 12 is a view showing a reception sensitive level of the modification of the third position detecting control under a large distance.
Figure 13:
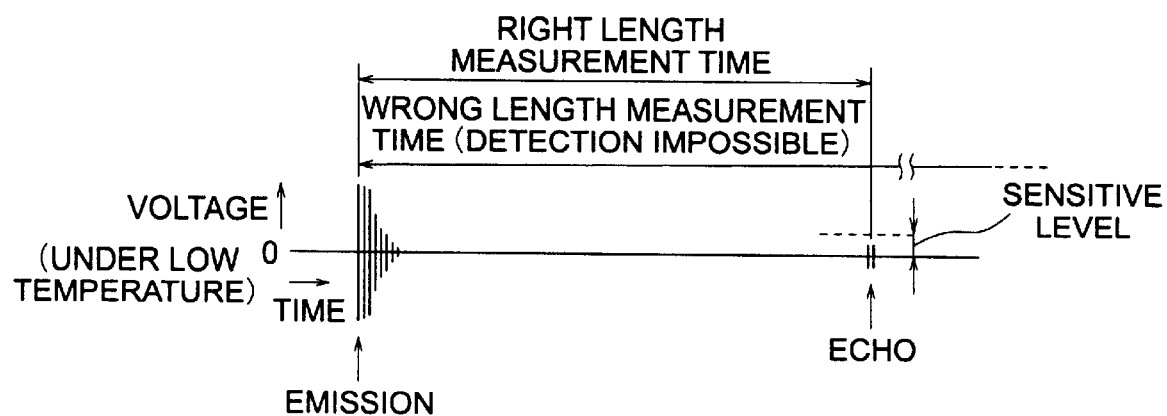
FIG. 13 is a view showing a relationship between a received wave and a reception sensitive level of a conventional position detecting device.
Figure 14:
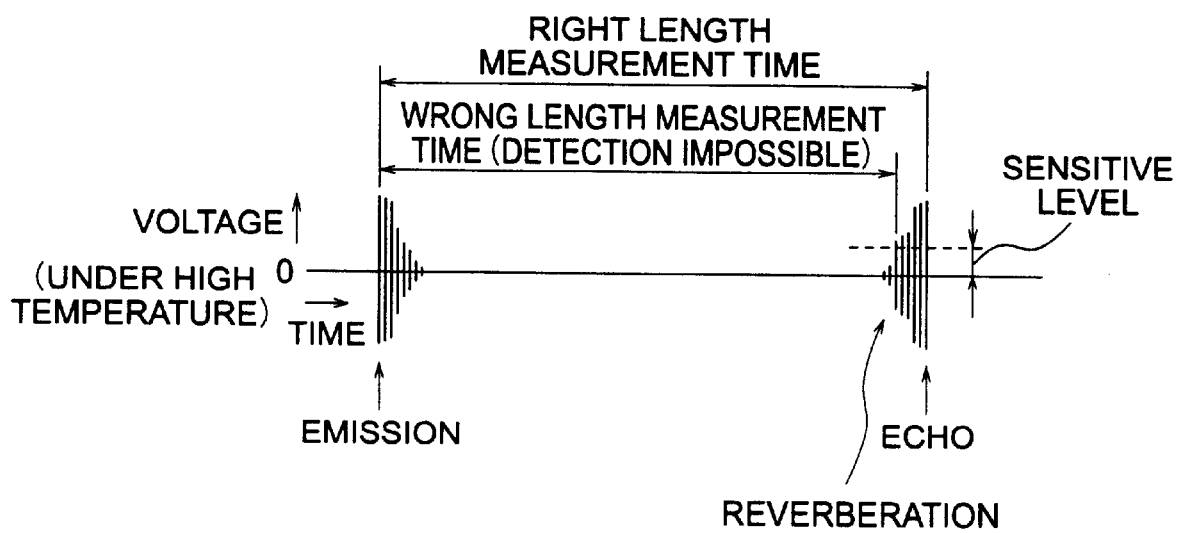
FIG. 14 is a view showing a relationship between a received wave and a reception sensitive level of the conventional position detecting device under a low temperature.
Figure 15:
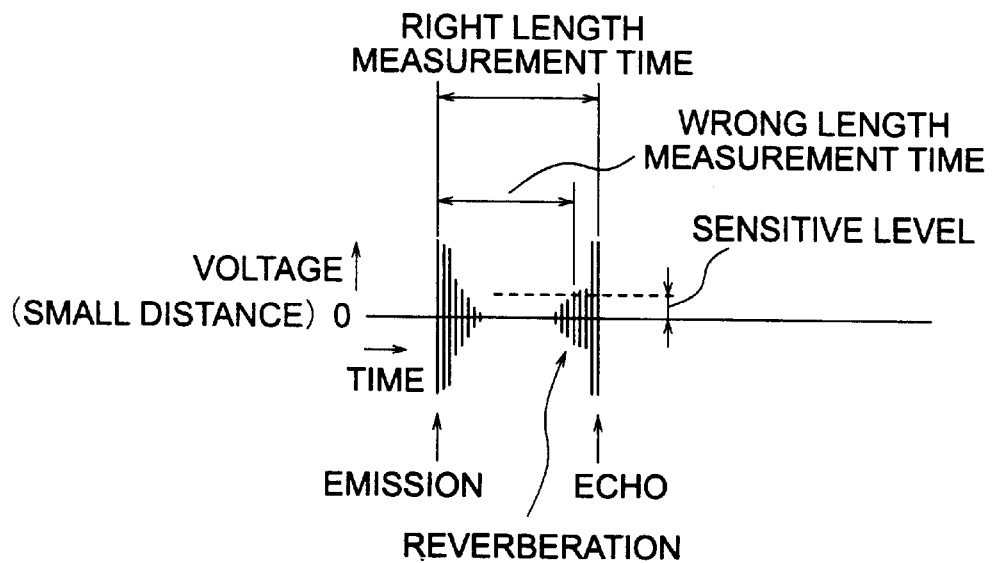
FIG. 15 is a view showing a relationship between a received wave and a reception sensitive level of the conventional position detecting device under a high temperature.
Figure 16:
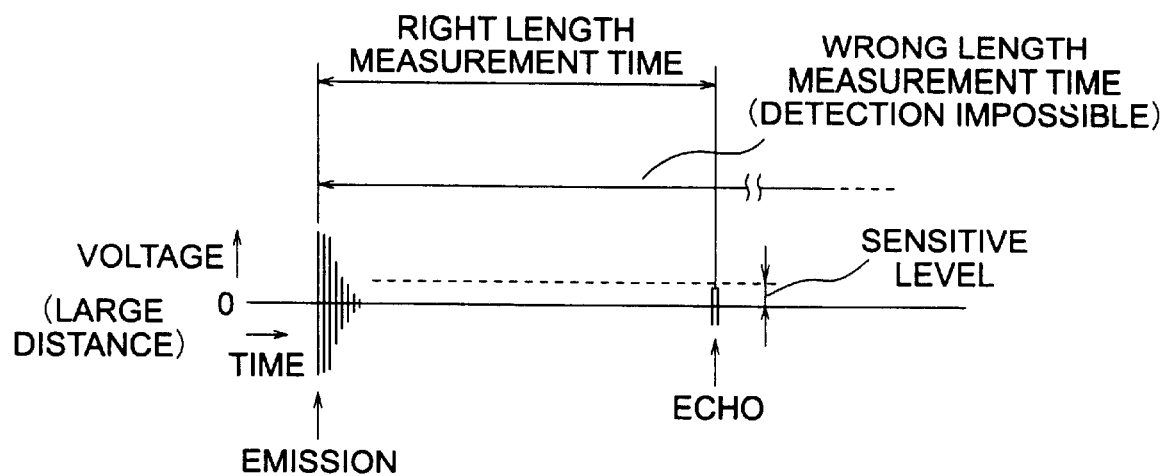
FIG. 16 is a view showing a relationship between a received wave and a reception sensitive level of the conventional position detecting device under a small distance.

In addition, the reception sensitive level set on the basis of the position data may be selectively set to a high level (L3), an intermediate level (L4) and a low level (L5) in a step-wise manner along a three-step patterns as shown in FIGS. 10, 11 and 12 in accordance with the distance between the ultrasonic wave sensor 11 and the lower end surface of the piston rod 6.

As shown in FIG. 10, the reception sensitive level L3 is set to the high level if the position data are in a range of the small distance. This makes it possible to permit the reception of only the echo whose amplitude is large and inhibit the reverberation whose amplitude is small.

As shown in FIG. 11, the reception sensitive level L4 is set to the intermediate level if the position data are in a range of the intermediate distance. This makes it possible to permit the reception of only the echo and inhibit the reverberation generated in the range of the intermediate distance.

As shown in FIG. 12, the reception sensitive level L5 is set to the low level if the position data are in a range of the large distance. In this case, since the reverberation is not generated, it is possible to receive the echo whose amplitude is small.

As described above, by setting the reception sensitive level in accordance with the previously detected position data of the piston rod 6, it is possible to accurately count the time elapsed from the point at which the ultrasonic wave is emitted from the ultrasonic wave sensor 11 to the point at which the ultrasonic wave reflected by the lower surface of the piston rod 6 is received. This makes it possible for the microcomputer 17 to accurately detect the position of the piston rod 6 on the basis of the time elapsed.

Fourth Position Detecting Control:

A fourth position detecting control will be described, which sets a strength of the ultrasonic wave emitted from the ultrasonic wave sensor 11 in accordance with the position data in place of setting the reception sensitive level in accordance with the position data.

In the case where the position data are considered to correspond to the small distance, the microcomputer 17 sets a low voltage to be applied to the vibration element of the ultrasonic wave sensor 11 so as to make small the amplitude of the ultrasonic wave emitted from the ultrasonic wave sensor 11. This can suppress the generation of the reverberation and permit the reception of only the echo.

In the case where the position data are considered to correspond to the large distance, the microcomputer 17 sets a high voltage to be applied to the vibration element of the ultrasonic wave sensor 11 so as to make large the amplitude of the ultrasonic wave emitted from the ultrasonic wave sensor 11. This can enlarge the amplitude of the echo to make sure that the echo is received.

As described above, in this position detecting control, the strength of the ultrasonic wave emitted from the ultrasonic wave sensor 11 is set on the basis of the previously detected position data of the piston rod 6. Therefore, it is possible to accurately count the time elapsed from the point at which the ultrasonic wave is emitted from the ultrasonic wave sensor 11 to the point at which the ultrasonic wave reflected by the lower surface of the piston rod 6 is received. This makes it possible for the microcomputer 17 to accurately detect the position of the piston rod 6 on the basis of the time elapsed.

In addition, there are various kinds of working oils which can be used as a pressure medium of the hydraulic cylinder 5, and temperature characteristics of the working oils depend on the kinds of the working oils. Accordingly, it is preferable to store the respective temperature characteristics of the working oils in the microcomputer 17 so as to cope with the various working oils. During the length measurement, the strength of the ultrasonic wave to be emitted and the reception sensitive level for the ultrasonic wave can be adjusted in accordance with the temperature of the working oil used, and therefore the position of the movable member of the hydraulic cylinder 5 can be detected more accurately.

Note that, the third and fourth position detecting controls described above can be employed not only in the case where the working oil is used as the pressure medium of the hydraulic cylinder but also in a case where the air is used as the pressure medium thereof.

What is claimed is:

1. A position detecting device for detecting a position of a movable member, which moves within a hydraulic cylinder, by using an ultrasonic wave, the device comprising:

an ultrasonic wave sensor which emits the ultrasonic wave toward the movable member and receives the ultrasonic wave reflected by the movable member;

position calculating means for counting a time elapsed from an emission of the ultrasonic wave to a reception of the reflected ultrasonic wave by the ultrasonic wave sensor to calculate a position of the movable member relative to the ultrasonic wave sensor on the basis of the time elapsed thus counted;

a temperature sensor which detects a temperature of fluid through which the ultrasonic wave is propagated within the cylinder; and reception sensitive level setting means for variably setting a reception sensitive level for the ultrasonic wave received by the ultrasonic wave sensor, wherein the reception sensitive level setting means sets the reception sensitive level for the ultrasonic wave based on the temperature of the fluid detected by the temperature sensor, so as to include a range in which it is made consecutively higher as the temperature of the fluid detected by the temperature sensor is made higher.

2. An industrial vehicle having the position detecting device according to claim 1.

3. A position detecting device for detecting a position of a movable member, which moves within a hydraulic cylinder, by using an ultrasonic wave, the device comprising:

an ultrasonic wave sensor, which emits the ultrasonic wave toward the movable member and receives the ultrasonic wave reflected by the movable member;

position calculating means for counting a time elapsed from an emission of the ultrasonic wave to a reception of the reflected ultrasonic wave by the ultrasonic wave sensor to calculate a position of the movable member relative to the ultrasonic wave sensor on the basis of the time elapsed thus counted;

a temperature sensor which detects a temperature of fluid through which the ultrasonic wave is propagated within the cylinder; and ultrasonic wave strength setting means for variably setting a strength of the ultrasonic wave emitted from the ultrasonic wave sensor, wherein the ultrasonic wave strength setting means sets the strength of the ultrasonic wave based on the temperature of the fluid detected by the temperature sensor, so as to be smaller in a stepwise manner as the temperature of the fluid detected by the temperature sensor is made higher.

4. A position detecting device for detecting a position of a movable member, which moves within a hydraulic cylinder, by using an ultrasonic wave, the device comprising:

an ultrasonic wave sensor, which emits the ultrasonic wave toward the movable member and receives the ultrasonic wave reflected by the movable member;

position calculating means for counting a time elapsed from an emission of the ultrasonic wave to a reception of the reflected ultrasonic wave by the ultrasonic wave sensor to calculate a position of the movable member relative to the ultrasonic wave sensor on the basis of the time elapsed thus counted;

a temperature sensor which detects a temperature of fluid through which the ultrasonic wave is propagated within the cylinder; and ultrasonic wave strength setting means for variably setting a strength of the ultrasonic wave emitted from the ultrasonic wave sensor, wherein the ultrasonic wave strength setting means sets the strength of the ultrasonic wave based on the temperature of the fluid detected by the temperature sensor, so as to include a range in which it is made consecutively smaller as the temperature of the fluid detected by the temperature sensor is made higher.

5. The position detecting device according to claim 3, further comprising:

storage means for storing the position of the movable member as the latest position data each time after the position of the movable member is calculated, the ultrasonic wave strength setting means setting the strength of the ultrasonic wave based on the latest position data.

6. The position detecting device according to claim 5, wherein the ultrasonic wave strength setting means sets the strength of the ultrasonic wave so as to be made larger as the position of the movable member based on the latest position data is further from the ultrasonic wave sensor.

7. An industrial vehicle having the position detecting device according to claim 4.

8. A position detecting device for detecting a position of a movable member, which moves within a hydraulic cylinder, by using an ultrasonic wave, the device comprising:

an ultrasonic wave sensor which emits the ultrasonic wave toward the movable member and receives the ultrasonic wave reflected by the movable member;

position calculating means for counting a time elapsed from an emission of the ultrasonic wave to a reception of the reflected ultrasonic wave by the ultrasonic wave sensor to calculate a position of the movable member relative to the ultrasonic wave sensor on the basis of the time elapsed thus counted;

a temperature sensor which detects a temperature of fluid through which the ultrasonic wave is propagated within the cylinder; and reception sensitive level setting means for variably setting a reception sensitive level for the ultrasonic wave received by the ultrasonic wave sensor, wherein the reception sensitive level setting means sets the reception sensitive level for the ultrasonic wave based on the temperature of the fluid detected by the temperature sensor, so as to be made higher in a step-wise manner as the temperature of the fluid detected by the temperature sensor is made higher.

9. The position detecting device according to claim 8, further comprising:

storage means for storing the position of the movable member as the latest position data each time after the position of the movable member is calculated, the reception sensitive level setting means setting the reception sensitive level for the ultrasonic wave based on the latest position data.

10. The position detecting device according to claim 9, wherein the reception sensitive level setting means sets the reception sensitive level of the ultrasonic wave so as to be made smaller as the position of the movable member based on the latest position data is further from the ultrasonic wave sensor.

* * * * *